United States Patent [19]
Kim

[11] Patent Number: 5,944,977
[45] Date of Patent: Aug. 31, 1999

[54] HYDROGEN-OCCLUDING ALLOY PRETREATMENT METHOD, PRETREATED HYDROGEN-OCCLUDING ALLOY, AND NICKEL-HYDROGEN SECONDARY BATTERY EMPLOYING THE SAME AS AN ANODE

[75] Inventor: Ki-ho Kim, Suwon, Rep. of Korea

[73] Assignee: Samsung Display Devices Co., Ltd., Kyungki-Do, Rep. of Korea

[21] Appl. No.: 08/924,034

[22] Filed: Sep. 5, 1997

[30] Foreign Application Priority Data

Dec. 31, 1996 [KR] Rep. of Korea ............... 96-80194

[51] Int. Cl.$^6$ ........................................... C25D 3/00
[52] U.S. Cl. ................ 205/236; 205/238; 205/255; 205/256; 205/152; 205/57; 205/259
[58] Field of Search ................ 420/900; 429/59, 429/101; 204/293, 290 R, 290 F; 428/548, 615, 617, 655, 660; 205/57, 152, 232, 236, 255, 256, 238, 259

[56] References Cited

U.S. PATENT DOCUMENTS

| 2,599,178 | 6/1952 | Holt et al. ........................ 205/256 |
| 2,653,127 | 9/1953 | Brenner et al. ................... 205/256 |
| 3,947,331 | 3/1976 | Kinh et al. ....................... 205/256 |
| 5,338,433 | 8/1994 | Maybee et al. ................... 205/255 |
| 5,451,474 | 9/1995 | Wu et al. ......................... 420/900 |

*Primary Examiner*—Bruce F. Bell
*Attorney, Agent, or Firm*—Leydig, Voit & Mayer, Ltd.

[57] ABSTRACT

A method of pretreating a hydrogen-occluding alloy, by electrically plating the hydrogen-occluding alloy with a Co—V alloy or a Co—Mo alloy. A nickel-hydrogen secondary battery manufactured using the pretreated hydrogen-occluding alloy has an increased initial activation rate and an increased high rate discharge characteristic.

10 Claims, No Drawings

HYDROGEN-OCCLUDING ALLOY PRETREATMENT METHOD, PRETREATED HYDROGEN-OCCLUDING ALLOY, AND NICKEL-HYDROGEN SECONDARY BATTERY EMPLOYING THE SAME AS AN ANODE

BACKGROUND OF THE INVENTION

1. Field of the Invention

The present invention relates to a secondary battery, and more particularly, to a hydrogen-occluding alloy pretreatment method, a hydrogen-occluding alloy pretreated by this method, and a nickel-hydrogen secondary battery employing the pretreated hydrogen-occluding alloy as an anode.

2. Description of the Related Art

Since hydrogen burns to become water and, unlike a fossil fuel, does not produce a carbon oxide gas, hydrogen can be used as a clean energy source. In an electrochemical process, hydrogen can generate electrical energy, i.e., discharging, by oxidizing into water. If the electrical energy is applied to the water, i.e., charging, hydrogen can be restored. In this case, if oxygen is used for a cathode, hydrogen and oxygen are mixed in a vessel unless a specific battery structure is employed. To prevent this phenomenon, a nickel-hydrogen battery using nickel as a cathode and a hydrogen-occluding alloy for an anode has been used.

Particularly, a nickel-hydrogen secondary battery, using the hydrogen-occluding alloy as an anode active material, is more widely applied than a nickel-zinc battery or a nickel-cadmium battery. This is because the volume energy density of the battery can be increased, since the hydrogen-occluding alloy exhibits little change in its form and exhibits a high efficiency of active material utilization, and the specific weight thereof is larger than that of cadmium (Cd) or zinc (Zn).

The nickel-hydrogen secondary battery includes a nickel cathode, an anode formed of a hydrogen-occluding alloy, an electrolyte that is an alkali aqueous solution, and a separator which is highly hydrophilic and stable in the alkaline electrolytic solution.

The reactions at the cathode and anode of the nickel-hydrogen secondary battery during charging can be represented by:

Cathode: $Ni(OH)_2 + OH^- \rightarrow NiOOH + H_2O + e^-$

Anode: $M + H_2O + e^- \rightarrow MH + OH^-$

Overall battery reaction: $Ni(OH)_2 + M^- \rightarrow NiOOH + MH$ where M denotes a hydrogen-occluding alloy.

The hydrogen-occluding alloy, which is capable of reversible occlusion and release of hydrogen, occludes hydrogen generated at the anode at the time of charging and releases the hydrogen at the time of discharging, so that electrochemical consumption of hydrogen occurs on the surface thereof.

General hydrogen-occluding alloys are largely classified into AB series alloys such as TiFe, $AB_2$ series alloys such as $ZrMn_2$, $ZrV_2$ and $ZrNi_2$, $AB_5$ series alloys such as $CaNi_5$, $LaNi_5$ and $MmNi_5$ (Mm: a misch metal; a group of rare earth elements like La or Ce) and $A_2B$ series alloys such as $Mg_2Ni$ and $Mg_2Cu$, where A represents an exothermic metal and B represents an endothermic metal. If the hydrogen-occluding alloy is intended to be used for a battery, its hydrogen occluding capacity is preferably excellent, equilibrium pressure between occlusion and release of hydrogen is preferably between about 0.1 to 5 MPa, and it preferably has a strong corrosion resistance.

However, among active materials in the form of the hydrogen-occluding alloy forming the anode of a nickel-hydrogen battery, metal components such as Co, Mn or Vd dissolve easily in an alkali solution as impurities. Thus, if the hydrogen-occluding alloy forming the anode is used for a long time with a strongly alkaline electrolyte, the composition of the anode changes, thereby shortening the life of the battery, which deteriorates the battery performance.

Therefore, if the hydrogen-occluding alloy is to be used as the anode material, it is desirable to pretreat the surface of the alloy.

Conventionally, the hydrogen-occluding alloy is pretreated in an alkali aqueous solution at about 80° C. for several hours, that is stirred using a glass stick or mechanical stirrer having a stirring stick with a propeller. By such a pretreatment, an oxide film is removed from the surface of the hydrogen-occluding alloy and specific metal components are stripped from the alloy surface to change the composition of the alloy surface. The anode of the nickel-hydrogen battery is manufactured using the pretreated hydrogen-occluding alloy, to thereby achieve improved battery performance.

In the case of the $AB_5$ series hydrogen-occluding alloy pretreated by etching in an alkali solution, the electrode manufactured therewith is sufficiently activated after the first 2–3 cycles and exhibits a high capacity at a high discharge current of about 1 C. That is, the high rate discharge characteristic is excellent. However, problems due to severity of an alkali etching method cannot be avoided. The Zr- or Ti-based $AB_2$ series hydrogen-occluding alloy is not sufficiently activated by such an alkali pretreatment. So an electrode manufactured using the same requires a charge and a discharge of about 10 to 20 cycles for activation. Further, if the discharge current is increased, the capacity sharply decreases. It is believed that the sharp decrease of the capacity the Zr- or Ti-based $AB_2$ series alloy is due to its poor electrochemical catalytic characteristic. Therefore, to solve the problem, a separate treatment must be carried out.

SUMMARY OF THE INVENTION

To solve the above problems, it is an object of the present invention to provide a method of pretreating a hydrogen-occluding alloy, to increase the initial activation rate of a nickel-hydrogen battery and to improve the high rate discharge characteristic.

It is another object of the present invention to provide a hydrogen-occluding alloy having excellent high rate discharge characteristic, by being pretreated in the above-described pretreatment method.

It is still another object of the present invention to provide a nickel-hydrogen secondary battery employing an anode having the pretreated hydrogen-occluding alloy as an active material.

Accordingly, to achieve the first object, there is provided a hydrogen-occluding alloy pretreatment method comprising electrically plating a Co—V alloy or a Co—Mo alloy onto the surface of the hydrogen-occluding alloy.

The second object is achieved by a hydrogen-occluding alloy pretreated to have a plating layer formed of a Co—V alloy or a Co—Mo alloy.

The third object is achieved by a nickel-hydrogen secondary battery employing as an anode the hydrogen-occluding alloy, plated with a Co—V alloy or a Co—Mo alloy.

Preferably, the hydrogen-occluding alloy is $AB_2$ series alloy based on Zr or Ti.

DESCRIPTION OF THE PREFERRED EMBODIMENT(S)

In the present invention, there is provided a nickel-hydrogen battery having an increased initial activation rate by pretreating a hydrogen-occluding alloy with a Co—V alloy or a Co—Mo alloy.

Based on the hydrogen-occluding alloy of the present invention, the content of a plated layer is preferably between about 1~20 wt %. If the content of the plated layer is less than 1 wt %, the plating pretreatment is not as effective. If the content of the plated layer is greater than 20 wt %, the absolute amount of the hydrogen-occluding alloy may be decreased reducing the hydrogen storage capacity, which is not desirable.

Also, the plating composition, used to electrically plate the hydrogen-occluding alloy, includes cobalt sulfate ($CoSO_4$), sodium citrate and urea, preferably in concentrations of about 0.1~2 mol/l, about 0.1~1 mol/l and about 1~5 mol/l, respectively. Also, the plating composition may include vanadium oxide ($V_2O_5$) for Co—V plating, and may further include ammonium molybdate for Co—Mo plating. The content of vanadium oxide and/or ammonium molybdate is preferably between about $10^{-5}$~$10^{-1}$ mol/l. Within this range, the plating process is performed smoothly. During the plating process, the plating current is preferably between about 100 to 700 $mA/cm^2$.

Hereinbelow, the present invention will be described in more detail through embodiments. However, the invention is not limited to the following examples.

EXAMPLE 1

A hydrogen-occluding alloy ($ZrNi_{1.1}V_{0.3}Mn_{0.4}Cr_{0.1}Co_{0.1}$) was produced using a high frequency induction furnace and then crushed. From the crushed alloy, powder having a particle diameter of about 75 μm was selected. 500 g of the selected powder was put in an electrode formed of a nickel net, which was then placed in a plating device.

For forming a plated layer of Co—V alloy on the surface of the hydrogen-occluding alloy, a mixture consisting of 0.5 mol/l of CoSO4, 0.5 mol/l of sodium citrate, 0.0004 mol/l of $V_2O_5$ and 3 mol/l of urea was used. Also, pure cobalt was used as an electrode. While the solution was stirred slowly using Ar gas, plating was conducted with a current of 300 $mA/cm^2$ at room temperature for about 10 minutes, to form a plated layer of the Co—V alloy on the surface of the hydrogen-occluding alloy.

A paste was manufactured using the pretreated hydrogen-occluding alloy, polyvinyl alcohol (PVA) and water, by a conventional electrode forming method. A nickel foam having a porosity of 95% or more was filled with the paste, dried and then pressed to manufacture a hydrogen-occluding alloy anode. A nickel hydroxide anode having a capacity twice that of the anode was used as an antielectrode to the anode, and potassium hydroxide aqueous solution with a concentration of up to 31 wt %, was used as an electrolyte, thereby forming a half battery. Charge and discharge cycles were repeatedly conducted for the half battery, where the battery was charged to 150% with 0.1 C for 15 hours, and then discharged with 0.1 C until the battery voltage reached 0.9 V, to measure the activation rate. After the battery was fully activated, the battery was charged again under the same condition, then discharged with 1 C until 0.9 V of the battery voltage was reached, to evaluate the high rate discharge characteristic. The results thereof are shown in Table 1.

EXAMPLE 2

Except that a plating solution was produced using ammonium molybdate instead of $V_2O_5$, a plated layer made of a Co—Mo alloy was formed on the surface of the hydrogen-occluding alloy by the same method as described in Example 1. Subsequently, charge and discharge tests were conducted in the manner as described in Example 1, and the results thereof are also shown in Table 1.

COMPARATIVE EXAMPLE

For the purpose of comparison, a nickel-hydrogen secondary battery was prepared in the same manner as described in Example 1 using a hydrogen-occluding alloy without a plated layer, and then tests were conducted. The results thereof are shown in Table 1.

TABLE 1

| Number of Cycles | 1 | 3 | 10 | 20 | High rate (1C) Discharge capacity |
|---|---|---|---|---|---|
| Example 1 | 270 mAh/g | 322 mAh/g | 327 mAh/g | 330 mAh/g | 290 mAh/g |
| Example 2 | 275 mAh/g | 325 mAh/g | 330 mAh/g | 330 mAh/g | 300 mAh/g |
| Comparative Example | 50 mAh/g | 100 mAh/g | 250 mAh/g | 320 mAh/g | 200 mAh/g |

It is clear, from the results of the examples and comparative example, that the activation rate of the nickel-hydrogen secondary battery, employing as an anode the hydrogen-occluding alloy pretreated according to the present invention to have a plating layer of a Co—Mo alloy or a Co—V alloy, is greatly improved, and that the high rate discharge characteristic is also greatly enhanced.

As described above, according to the present invention, a hydrogen-occluding alloy having a plated layer of a Co—V alloy or a Co—Mo alloy is used as an anode active material of a nickel-hydrogen secondary battery, so that the initial activation rate can be greatly increased and the high rate discharge characteristic can be greatly improved, thereby extending the applicable range of the battery.

What is claimed is:

1. A pretreatment method comprising electrically plating a Co—V alloy from a plating solution including cobalt sulfate, sodium citrate, urea, and vanadium oxide onto a surface of a hydrogen-occluding alloy.

2. The pretreatment method of claim 1, wherein the hydrogen-occluding alloy is an $AB_2$ series alloy based on Zr or Ti.

3. The pretreatment method of claim 1, including plating at a current density between about 100 to about 700 $mA/cm^2$.

4. A pretreatment method comprising electrically plating a Co—Mo alloy onto a surface of a hydrogen-occluding alloy.

5. The pretreatment method of claim 4, wherein the hydrogen-occluding alloy is an $AB_2$ series alloy based on Zr or Ti.

6. The pretreatment method of claim 4, including plating at a current density between about 100 to about 700 mA/cm$^2$.

7. The pretreatment method of claim 4, comprising electrically plating the Co—Mo alloy from a plating solution including cobalt sulfate, sodium citrate, urea, and ammonium molybdate.

8. An article comprising a hydrogen-occluding alloy having an electroplated layer of a Co—Mo alloy.

9. The article of claim 8, wherein the hydrogen-occluding alloy comprises an $AB_2$ series alloy based on Zr or Ti.

10. A nickel-hydrogen secondary battery employing an anode having as an active material a hydrogen-occluding alloy with a surface plated with a Co—Mo alloy.

\* \* \* \* \*